(12) United States Patent
Yamauchi et al.

(10) Patent No.: US 9,576,564 B2
(45) Date of Patent: Feb. 21, 2017

(54) PERFORMANCE RECORDING APPARATUS (71) Applicant: YAMAHA CORPORATION, Hamamatsu-shi, Shizuoka (JP)

(72) Inventors: Kenichi Yamauchi, Hamamatsu (JP); Taro Kawabata, Hamamatsu (JP); Fukutaro Okuyama, Hamamatsu (JP)

(73) Assignee: YAMAHA CORPORATION, Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/892,235

(22) PCT Filed: May 21, 2014

(86) PCT No.: PCT/JP2014/063497
§ 371 (c)(1),
(2) Date: Nov. 19, 2015

(87) PCT Pub. No.: WO2014/189084
PCT Pub. Date: Nov. 27, 2014

(65) Prior Publication Data
US 2016/0125861 A1 May 5, 2016

(30) Foreign Application Priority Data
May 21, 2013 (JP) .................................. 2013-107000

(51) Int. Cl.
*G10H 1/00* (2006.01)
*G10G 3/04* (2006.01)
*G06K 9/00* (2006.01)

(52) U.S. Cl.
CPC ........ *G10H 1/0033* (2013.01); *G06K 9/00442* (2013.01); *G10G 3/04* (2013.01);
(Continued)

(58) Field of Classification Search
CPC .................................. G10H 1/033; G10H 1/00
See application file for complete search history.

(56) References Cited

U.S. PATENT DOCUMENTS 4,261,241 A * 4/1981 Gould ..................... G09B 15/04
84/483.2
4,422,361 A * 12/1983 Ishii ...................... G10H 1/0041
84/483.1
(Continued)

FOREIGN PATENT DOCUMENTS

JP          1145088 A     2/1999
JP       2008233574 A    10/2008
(Continued)

OTHER PUBLICATIONS

International Search Report issued in PCT/JP2014/063497, mailed Jul. 22, 2014. English translation provided.
(Continued)

*Primary Examiner* — Robert W Horn
(74) *Attorney, Agent, or Firm* — Rossi, Kimms & McDowell LLP (57) ABSTRACT

A performance recording apparatus includes: a performance information acquiring unit which is configured to acquire performance information indicating a performance performed by a performer; a musical score information acquiring unit which is configured to acquire musical score information indicating a musical score that is used in the performance; and a producing unit which is configured to produce a performance file containing the performance information and the musical score information.

18 Claims, 5 Drawing Sheets

(52) U.S. Cl.
CPC ..... *G10H 1/0008* (2013.01); *G10H 2220/015* (2013.01); *G10H 2220/211* (2013.01); *G10H 2220/455* (2013.01); *G10H 2240/056* (2013.01)

(56) References Cited

U.S. PATENT DOCUMENTS

| | | | | |
|---|---|---|---|---|
| 5,883,970 | A * | 3/1999 | Kikuchi | G06K 9/033 |
| | | | | 382/113 |
| 5,952,597 | A * | 9/1999 | Weinstock | G10G 3/04 |
| | | | | 84/477 R |
| 6,046,394 | A * | 4/2000 | Hino | G09B 15/023 |
| | | | | 84/477 R |
| 6,084,167 | A * | 7/2000 | Akimoto | G10C 3/00 |
| | | | | 84/477 R |
| 6,084,168 | A * | 7/2000 | Sitrick | G09B 15/023 |
| | | | | 84/477 R |
| 6,137,041 | A * | 10/2000 | Nakano | G09B 15/00 |
| | | | | 84/470 R |
| 6,751,439 | B2 * | 6/2004 | Tice | G09B 15/00 |
| | | | | 434/307 R |
| 7,189,909 | B2 * | 3/2007 | Vinoly | G09B 15/00 |
| | | | | 348/143 |
| 7,238,876 | B1 * | 7/2007 | Worrall | G10H 1/0016 |
| | | | | 84/477 R |
| 8,067,682 | B2 * | 11/2011 | Fahn | G06K 9/00 |
| | | | | 84/609 |
| 8,338,684 | B2 * | 12/2012 | Pillhofer | G09B 15/00 |
| | | | | 84/470 R |
| 8,442,325 | B2 * | 5/2013 | Hong | G06K 9/00449 |
| | | | | 382/100 |
| 8,618,399 | B2 * | 12/2013 | Nakano | G09B 15/00 |
| | | | | 382/113 |
| 8,697,972 | B2 * | 4/2014 | Dripps | G09B 5/06 |
| | | | | 84/470 R |
| 8,735,707 | B2 * | 5/2014 | Paterson | G09B 15/00 |
| | | | | 84/470 R |
| 8,884,146 | B2 * | 11/2014 | Paterson | G09B 15/00 |
| | | | | 84/470 R |
| 9,053,691 | B2 * | 6/2015 | Sasaki | G10H 1/0066 |
| 9,275,616 | B2 * | 3/2016 | Uemura | G10H 1/0008 |
| 9,418,637 | B1 * | 8/2016 | Akbari | G10G 1/04 |
| 9,418,640 | B2 * | 8/2016 | Yoshinari | G10H 1/0033 |
| 2001/0045151 | A1 * | 11/2001 | Hayakawa | G10G 3/04 |
| | | | | 84/462 |
| 2007/0144333 | A1 * | 6/2007 | Kawabata | G10H 1/0066 |
| | | | | 84/609 |
| 2008/0190271 | A1 | 8/2008 | Taub et al. | |
| 2011/0283866 | A1 * | 11/2011 | Hogan | G09B 15/003 |
| | | | | 84/470 R |
| 2015/0082972 | A1 * | 3/2015 | Good | G09B 15/04 |
| | | | | 84/483.2 |
| 2016/0125861 | A1 * | 5/2016 | Yamauchi | G10G 3/04 |
| | | | | 84/462 |
| 2016/0125862 | A1 * | 5/2016 | Takahashi | G10H 1/0008 |
| | | | | 84/602 |

FOREIGN PATENT DOCUMENTS

| | | |
|---|---|---|
| JP | 2009229680 A | 10/2009 |
| JP | 2010518459 A | 5/2010 |

OTHER PUBLICATIONS

Written Opinion issued in PCT/JP2014/063497, mailed Jul. 22, 2014.

Office Action issued in Japanese Patent Application No. 2013-107000, mailed Nov. 8, 2016. English translation provided.

* cited by examiner

PERFORMANCE RECORDING APPARATUS

TECHNICAL FIELD

The present invention relates to a technique for recording information relating to a performance.

BACKGROUND ART

As an apparatus for recording performance information indicating contents of operations on a keyboard, there is a performance recording apparatus disclosed in Patent Literature 1. In an performance information record mode, the performance recording apparatus forms a set of performance information which is time-sequentially produced based on operations performed on a keyboard, and which indicates the pitch, and time information, stores the set in a temporary storage area, and further stores a performance record file in which a plurality of sets of performance information are bundled, in an external storage device. In a performance information reproduction mode, moreover, the performance recording apparatus searches for a performance record file corresponding to the time which is designated by the user, and reproduces the searched performance record file. In the performance recording apparatus, a mark name such as "Lesson" or "Birthday" can be set in the time information. When the title of a music piece is set as the mark name, for example, it is possible to know when and what music piece was performed.

CITATION LIST

Patent Literature

Patent Literature 1: JP-A-2008-233574

SUMMARY OF INVENTION

Technical Problem

According to the performance recording apparatus of Patent Literature 1, the user sets a mark name, and can know when and what music piece was performed. In the performance recording apparatus, when a mark name is to be set, however, the user must perform an operation of causing a setting screen to be displayed, and then manually input information such as the mark name, the year, month, and day, the time slot, and the like through an operating section. In a situation where a performance is performed by using the hands, some of performers feel such operations to be cumbersome.

The invention has been conducted under such circumstances. It is an object of the invention to provide a technique for easily recording information indicating a performance performed by a performer, and that indicating a performed music piece.

Solution to Problem

The invention provides a performance recording apparatus comprising: a performance information acquiring unit which is configured to acquire performance information indicating a performance performed by a performer; a musical score information acquiring unit which is configured to acquire musical score information indicating a musical score that is used in the performance; and a producing unit which is configured to produce a performance file containing the performance information and the musical score information.

In the performance recording apparatus, the performance recording apparatus may further comprise: an imaging unit, and the musical score information unit may be configured to acquire the musical score information based on image information which is taken by the imaging unit.

In the performance recording apparatus, in the performance file, date and time information indicating a date and time when the musical score information is acquired may be associated with the musical score information.

In the performance recording apparatus, the image information may be produced with a predetermined period, and the image information may be associated with date and time information indicating a date and time when the image information is acquired.

In the performance recording apparatus, the musical score information acquiring unit may be configured to acquire the image information which is taken by the imaging unit, as the musical score information.

In the performance recording apparatus, the musical score information acquiring unit may be configured to acquire the musical score information by performing pattern matching on the image information which is taken by the imaging unit, and musical score information which is previously stored.

In the performance recording apparatus, a code indicating the musical score may be written in the musical score, and the musical score information acquiring unit may be configured to analyze the code based on the image information which is taken by the imaging unit, thereby acquiring the musical score information.

In the performance recording apparatus, the musical score information acquiring unit may be configured to identify a portion corresponding to the musical score from the image information which is taken by the imaging unit, thereby acquiring the musical score information.

In the performance recording apparatus, the producing unit may be configured to produce the performance file that further contains the image information which is taken by the imaging unit.

In the performance recording apparatus, the performance recording apparatus may further comprise: a communicating unit which is to be connected to a computer apparatus, and the musical score information acquiring unit may be configured to acquire the musical score information based on image information of a musical score displayed on the computer apparatus, through the communicating unit.

In the performance recording apparatus, the musical score information acquiring unit may be configured to acquire the image information of the musical score displayed on the computer apparatus, based on information indicating a location where the image information of the musical score is stored.

The invention provides also a performance recording method comprising: acquiring performance information indicating a performance performed by a performer; acquiring musical score information indicating a musical score which is used in the performance; and producing a performance file containing the performance information and the musical score information.

In the performance recording method, the musical score information may be acquired based on image information which is taken by an imaging unit.

In the performance recording method, in the performance file, date and time information indicating a date and time when the musical score information is acquired may be associated with the musical score information.

In the performance recording method, the image information may be produced with a predetermined period, and the image information may be associated with date and time information indicating a date and time when the image information is acquired.

In the performance recording method, the image information which is taken by the imaging unit may be acquired as the musical score information.

In the performance recording method, the musical score information may be acquired by performing pattern matching on the image information which is taken by the imaging unit, and musical score information which is previously stored.

In the performance recording method, a code indicating the musical score may be written in the musical score, and the code may be analyzed based on the image information which is taken by the imaging unit, thereby acquiring the musical score information.

In the performance recording method, a portion corresponding to the musical score may be identified from the image information which is taken by the imaging unit, thereby acquiring the musical score information.

In the performance recording method, the performance file that further contains the image information which is taken by the imaging unit may be produced.

In the performance recording method, the musical score information may be acquired based on image information of a musical score displayed on a computer apparatus.

In the performance recording method, the image information of the musical score displayed on the computer apparatus may be acquired based on information indicating a location where the image information of the musical score is stored.

Advantageous Effects of Invention

According to the invention, information indicating a performance performed by a performer, and that indicating a performed music piece can be easily recorded.

DESCRIPTION OF EMBODIMENTS

Embodiment

Figure 1:
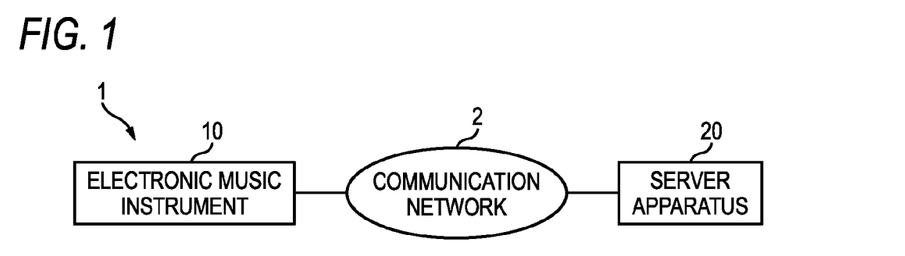
FIG. 1 is a view showing the whole configuration of a recording system 1 of an embodiment of the invention.

FIG. 1 is a view showing the whole configuration of a recording system 1 of an embodiment of the invention. In the recording system 1, an electronic music instrument 10, and a server apparatus 20 which stores information and files transmitted from the electronic music instrument 10 are connected to a communication network 2 through which computer apparatuses are connected to each other. Many electronic music instruments 10 and server apparatuses 20 can be connected to the communication network 2. In FIG. 1, in order to prevent the drawing from being complicated, however, one electronic music instrument 10 and one server apparatus 20 are shown.

(Configuration of Electronic Music Instrument 10)

Figure 2:
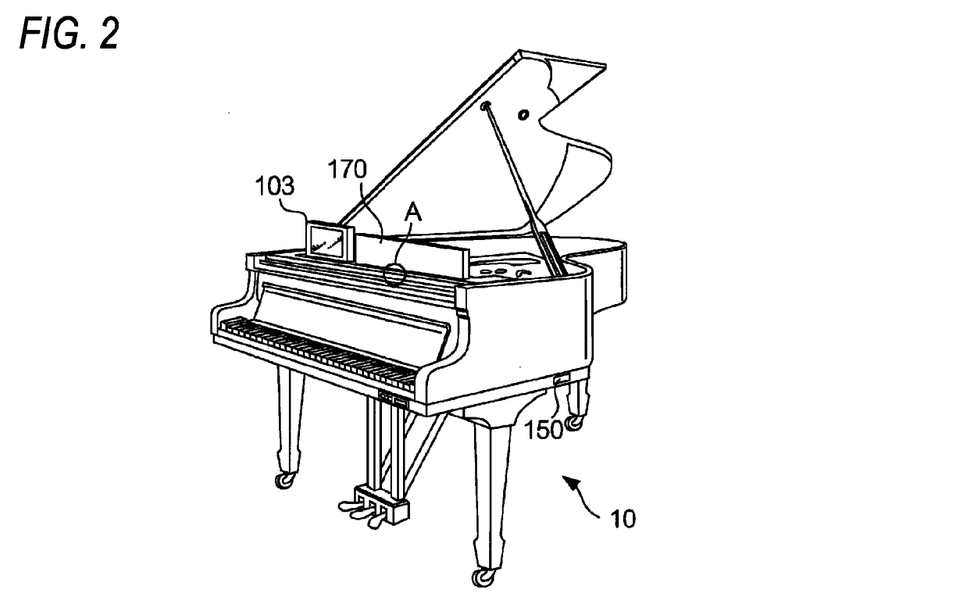
FIG. 2 is a view showing the appearance of an electronic music instrument 10.

In the embodiment, the electronic music instrument 10 is an automatic performance piano. FIG. 2 is a view showing the appearance of the electronic music instrument 10. The electronic music instrument 10 includes mechanisms which are identical with those of a usual acoustic piano, such as an action mechanism which strikes strings in accordance with movements of keys of a keyboard, dampers which stop vibrations of the strings, and the like. Moreover, the music instrument 10 includes configurations which are identical with those of a usual automatic performance piano, such as actuators which drive the keys, sensors which detect movements of the keys, and the like. The electronic music instrument 10 further includes an interface 150 through which various kinds of information are input and output, and a touch panel 103 which displays a screen for operating the electronic music instrument 10, and which receives instructions from the operator.

Figure 3:
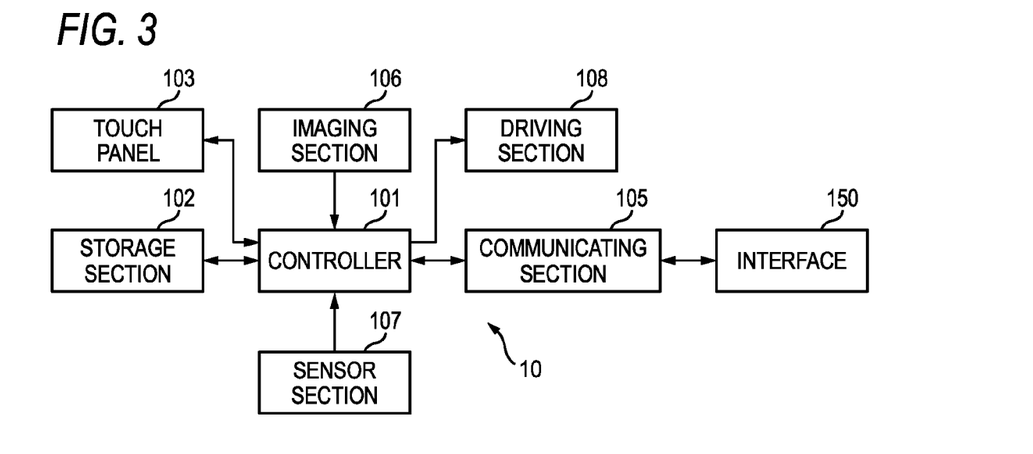
FIG. 3 is a view showing the hardware configuration of the electronic music instrument 10.

FIG. 3 is a block diagram showing the hardware configuration of the electronic music instrument 10. A storage section 102 includes a nonvolatile memory, and stores a music instrument identifier which uniquely identifies the electronic music instrument 10. The storage section 102 further stores various kinds of information and files which are produced by a controller 101. A communicating section 105 is connected to the interface 150. The communicating section 105 has a function of communicating with the server apparatus 20 through the interface 150 connected to the communication network 2. An imaging section 106 includes a camera module having a fisheye lens and an image sensor. The camera module is placed in a location where it can image a musical score placed on a music stand 170, such as a portion A which is circled in FIG. 2. The location of the camera module is not limited to that of the portion A, and may be another location as far as the camera module can take an image of a musical score placed on the music stand 170. The lens of the camera module is not limited to a fisheye lens, and may be a lens of another kind such as a wide-angle lens.

A sensor section 107 has sensors which detect movements of the keys of the keyboard. The sensors are disposed for respective keys of the keyboard. When the performer operates keys to perform a performance, a signal which corresponds to the movements of the keys is output from the sensor section 107 to the controller 101. A driving section 108 has actuators (for example, solenoids) which drive the keys of the keyboard. The actuators are disposed for respective keys of the keyboard. When an actuator is driven, a key operates, and the action mechanism operates in accordance with the movement of the key, thereby striking the string.

The controller 101 is a microcontroller including a CPU (Central Processing Unit), a ROM (Read Only Memory), and a RAM (Random Access Memory). When the CPU executes a program stored in the ROM, an automatic performance function is realized. When a program stored in the ROM is executed, a function of producing a MIDI (Musical Instrument Digital Interface: registered trademark) message in accordance with an operation on the keyboard, that of measuring the date and time, that of producing image information indicating the musical score placed on the music stand 170, and the like are realized.

The controller 101 controls the communicating section 105 so as to transmit the produced MIDI message (performance information), date and time information, image information, and the like to the server apparatus 20. Moreover, the controller 101 controls the communicating section 105 so as to acquire a MIDI message, date and time information, image information, and the like which are stored in the server apparatus 20. The controller 101 controls the driving section 108 in accordance with the MIDI message to perform an automatic performance, and controls the touch panel 103 in accordance with the image information to cause the touch panel 103 to display an image of the musical score.

Figure 4:
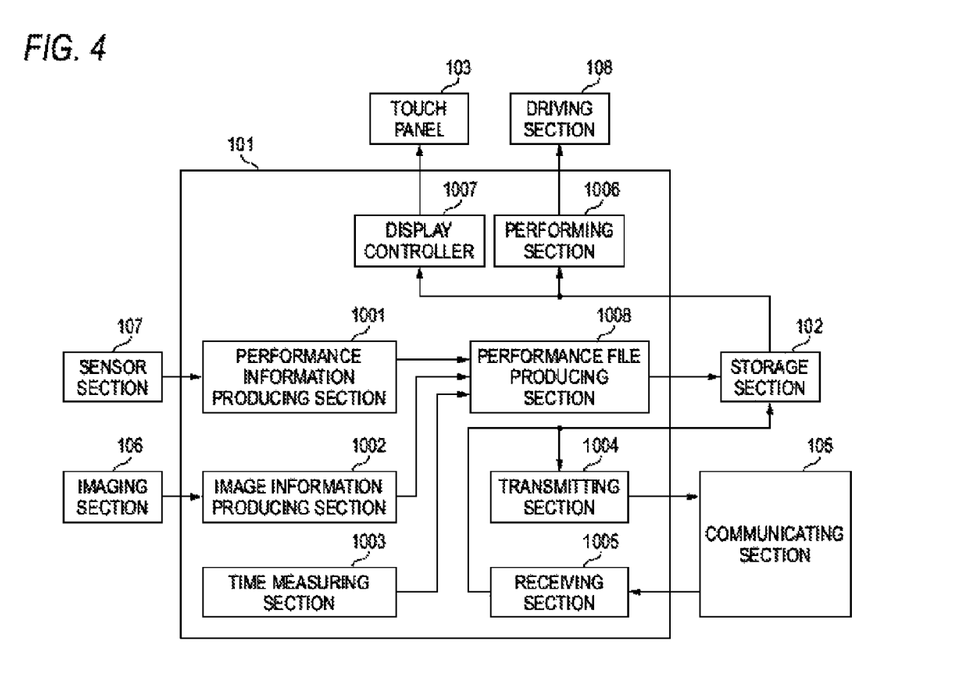
FIG. 4 is a block diagram showing the configuration of functions realized in the electronic music instrument 10.

FIG. 4 is a block diagram showing the configuration of functions realized in the controller 101. Based on a signal which is output from the sensor section 107, a performance information producing section 1001 produces a MIDI message containing information of performance operations such as note-on and note-off messages, note numbers corresponding to operated keys, and velocities corresponding to operations conducted on the keys.

An image information producing section 1002 produces an image of the musical score placed on the music stand 170, based on a video signal supplied from the camera module of the imaging section 106. Specifically, the image information producing section 1002 firstly planarizes an image indicated by the video signal which is supplied from the imaging section 106. The image which is obtained by the camera module is an image which is taken by the fisheye lens, and therefore the image is distorted. The image information producing section 1002 converts the distorted image to a planar image. As a method of converting an image taken by a fisheye lens to a planar image, for example, the well-known method described in "Kuruma ni tosaisarehajimeta gyogan renzu no kenkyu Part 2", Design Wave Magazine, CQ Publishing Co. Ltd., December issue of 2008, p. 113-127, "3 jigen kukan moderu o atsukau oyobunya ni arawareru josan•kaihei•gyakusu•gyakukaiheisu to sono enzan kairo sekkei", Design Wave Magazine, CQ Publishing Co. Ltd., May issue of 2007, p. 141-146, or the like may be used.

When the planarized image is produced, the image information producing section 1002 analyzes the produced image, and identifies a portion of the musical score in the image. In the identification of the musical score portion, the musical score portion may be identified by using pattern matching. Alternatively, an image of the music stand 170 in the case where a musical score is not placed thereon may be previously stored, the stored image and the taken image may be compared with each other, and a portion where there is a change may be identified as the musical score portion. When the musical score portion is identified, the image information producing section 1002 produces and outputs image information indicating an image of the identified musical score portion. In the embodiment, the image information producing section 1002 produces image information of the musical score as musical score information with a predetermined period (for example, 2 seconds).

A time measuring section 1003 measures the date and the time, and outputs date and time information indicating the measured date and time. A performance file producing section 1008 produces a performance file in which the MIDI message, the date and time information, and the image information are bundled. A transmitting section 1004 controls the communicating section 105 so as to transmit the MIDI message, the date and time information, the image information, and the like to the server apparatus 20. A receiving section 1005 controls the communicating section 105 so as to communicate with the server apparatus 20 to acquire the MIDI message, date and time information, image information, and the like which are stored in the server apparatus 20. A performing section 1006 controls the driving section 108 based on the MIDI message and the date and time information, so as to drive the keys. A display controller 1007 controls the touch panel 103 so as to display an image of the musical score indicated by the image information, on the touch panel 103.

(Configuration of Server Apparatus 20)

Figure 5:
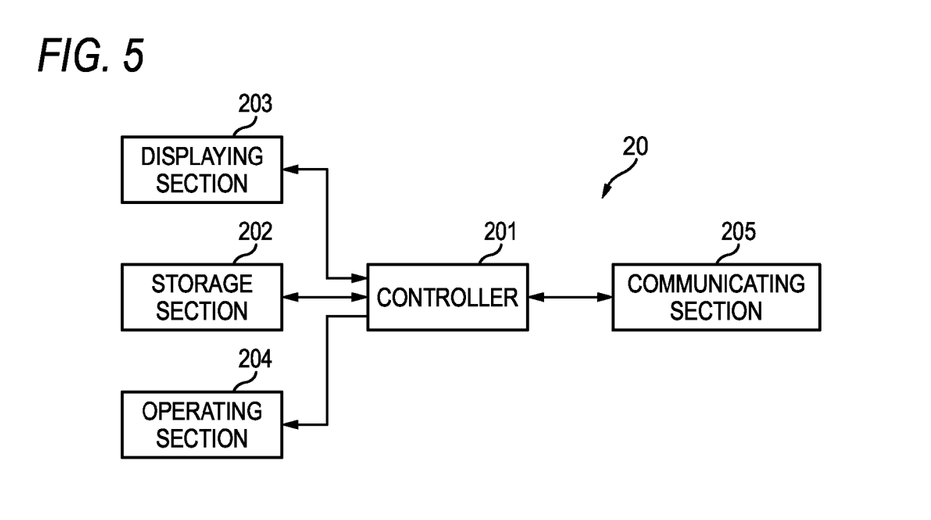
FIG. 5 is a view showing the hardware configuration of a server apparatus 20.

FIG. 5 is a block diagram showing the hardware configuration of the server apparatus 20. A communicating section 205 functions as an interface for communication through the communication network 2, and communicates with other apparatuses under control of a controller 201. A displaying section 203 includes a displaying device, and displays various screens for operating the server apparatus 20. An operating section 204 includes a keyboard and mouse for operating the server apparatus 20. When the keyboard or mouse of the operating section 204 is operated, various instructions for the server apparatus 20 are input from the user.

A storage section 202 includes a hard disk apparatus, and stores various kinds of information transmitted from the electronic music instrument 10, and programs for realizing server functions in a client-server system. The controller 201 is hardware for controlling various sections, and includes a CPU, a ROM, a RAM, etc. The CPU of the controller 201 reads out and executes the programs stored in the storage section 202 to control various sections of the server apparatus 20. When the CPU of the controller 201 executes the programs stored in the storage section 202, a function of storing various kinds of information transmitted from the electronic music instrument 10 in the storage section 202, that of transmitting various kinds of information stored in the storage section 202 to the electronic music instrument 10, and the like are realized in the server apparatus 20.

Next, an example of the operation of the embodiment will be described. When a performance is to be recorded, the user places a musical score on the music stand 170, and then conducts an operation of starting recording of the performance, through the touch panel 103. When the operation of starting recording of the performance is conducted, the controller 101 starts recording of a MIDI message and image information of the musical score. Specifically, when a signal which is output from the sensor section 107 in response to a depression of a key by the user is acquired (FIG. 6: YES in step SA1), the controller 101 produces a MIDI message containing information of performance operations such as a note-on message, the note number corresponding to the depressed key, and the velocity corresponding to the operation conducted on the key, in accordance with the signal output from the sensor section 107 (step SA2). The controller 101 associates and stores the MIDI message of the note on, and the date and time information (information of the date and time of acquisition) which is output from the time measuring section 1003 when the MIDI message is produced, in the storage section 102 (step SA3).

Figure 6:
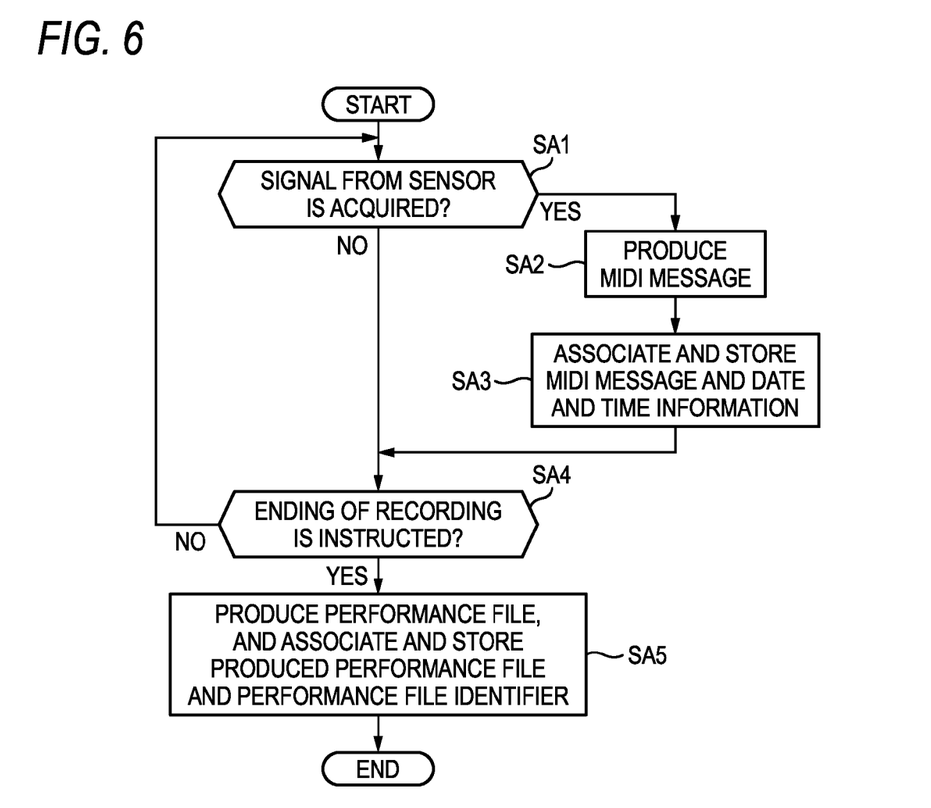
FIG. 6 is a flowchart showing the flow of a process performed by the electronic music instrument 10.

Next, in the electronic music instrument 10, when a signal which is output from the sensor section 107 in response to an operation of the user in which the finger releases the depressed key is acquired (FIG. 6: YES in step SA1), the controller 101 produces a MIDI message containing information of performance operations such as a note-off message, the note number corresponding to the released key, and the velocity corresponding to the operation conducted on the key, in accordance with the signal output from the sensor section 107 (step SA2). The controller 101 associates and stores the MIDI message of the note off, and the date and time information (information of the date and time of acquisition) which is output from the time measuring section 1003 when the MIDI message is produced, in the storage section 102 (step SA3).

Each time when a key operation is conducted, the controller 101 produces a MIDI message, and associates and stores the produced MIDI message and the date and time information (information of the date and time of acquisition) in the storage section 102.

Figure 7:
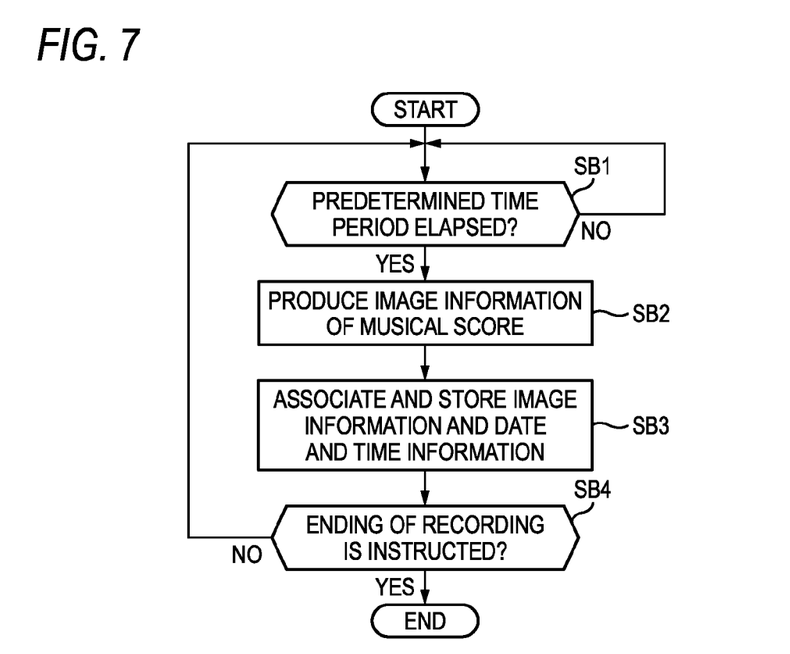
FIG. 7 is a flowchart showing the flow of a process performed by the electronic music instrument 10.

In the controller 101, upon each elapse of a predetermined time period (FIG. 7: YES in step SB1), the image information producing section 1002 produces image information indicating the image of the musical score (step SB2). The controller 101 associates and stores the produced image information and the date and time information which is output from the time measuring section 1003 when the image information is produced, in the storage section 102 (step SB3).

When the recording of the performance is to be ended, the user conducts an operation of instructing ending of recording of the performance, through the touch panel 103. When the operation of instructing ending of recording of the performance is conducted (YES in step SA4, YES in step SB4), the controller 101 produces a performance file in which MIDI messages, date and time information, and image information of the musical score that are stored during a period from the reception of the instructions for starting recording of the performance to that of the instructions for ending recording of the performance are bundled into one file. Namely, the controller 101 functions as a producing unit which produces a performance file. The controller 101 produces a performance file identifier which uniquely identifies the produced performance file, and stores the performance file containing the performance file identifier, in the storage section 102.

Next, the operation of reproducing a performance file will be described. When a performance file stored in the storage section 102 is to be reproduced, the user conducts an operation of instructing display of a list of performance files, through the touch panel 103. When the operation is conducted, the controller 101 refers the performance files stored in the storage section 102, and controls the touch panel 103 so as to display a list of the performance files. On the touch panel 103, as shown in FIG. 8, performance file identifiers contained in the performance files, date and time information which is earliest among the times contained in each of the performance files (the date and time of starting performance), date and time information which is latest among the times contained in the performance file (the date and time of ending performance), and the image of image information with which the earliest date and time information in the performance file is associated (the image of the musical score) are displayed.

Figure 8:
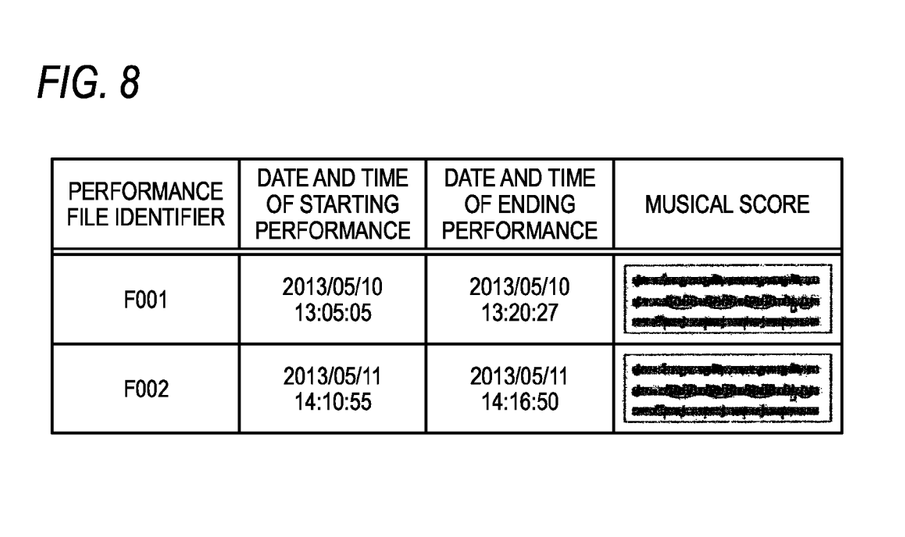
FIG. 8 is a view showing an example of a screen displayed by the electronic music instrument 10.
Figure 9:
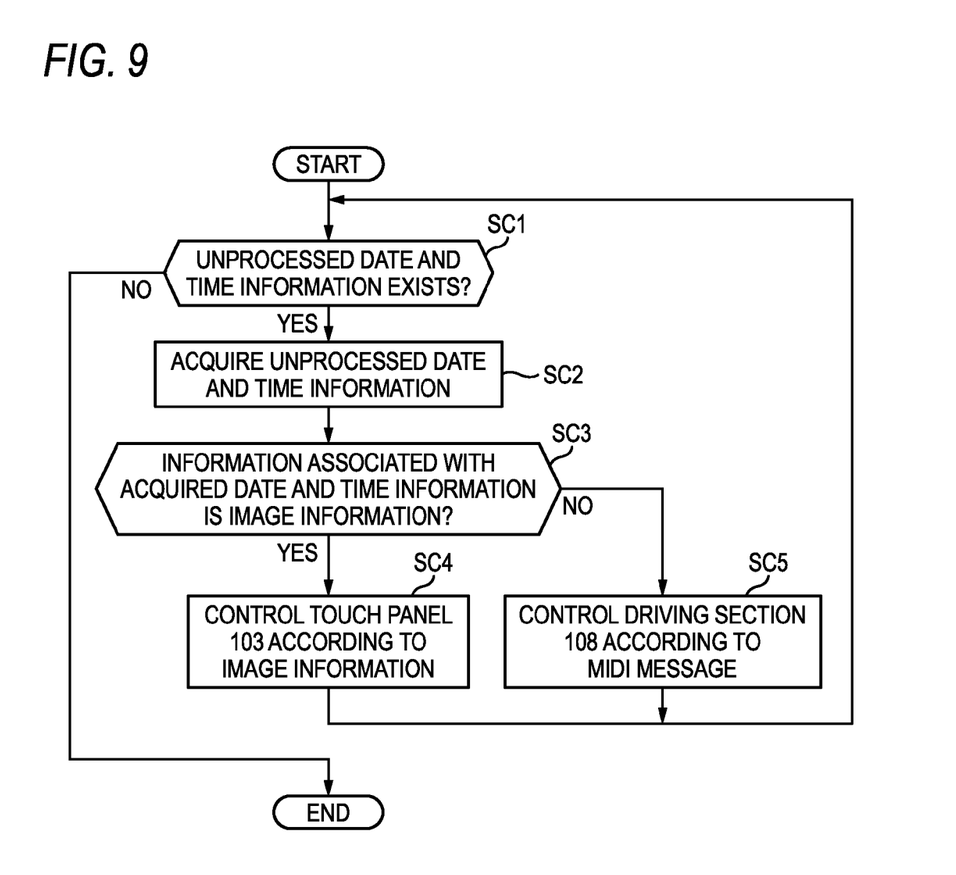
FIG. 9 is a flowchart showing the flow of a process performed by the electronic music instrument 10.

When the user selects a performance file from the list shown in FIG. 8, and an operation of instructing reproduction of the selected performance file is conducted through the touch panel 103, the controller 101 develops the MIDI message, image information, and date and time information contained in the performance file, in the RAM, and then executes a process shown in FIG. 9. The controller 101 determines whether unprocessed date and time information is in the developed date and time information or not. If all sets of the date and time information have been processed (NO in step SC1), the controller 101 ends the process of FIG. 9. The controller 101 sequentially processes the MIDI messages developed in the RAM in the order starting from a MIDI message in which the date and time of the associated date and time information is earlier, and controls the driving section 108 based on the MIDI message (YES in step SC1→step SC2→NO in step SC3→step SC5). When the MIDI message is processed, the driving section 108 is controlled based on the date and time information associated with the MIDI message. In the case where a note-off message in which the time of the date and time information is "13:06:06" exists next to a note-on message in which the time of the date and time information is "13:06:05", for example, the note-off message is after one second from the note-on message, and therefore the controller 101 drives the keys based on the note-off MIDI message, after one second from the driving of the keys based on the note-on MIDI message.

Furthermore, the controller 101 sequentially processes the image information developed in the RAM in the order starting from image information in which the date and time of the associated date and time information is earlier, and controls the touch panel 103 based on the image information (YES in step SC1→step SC2→YES in step SC3→step SC4). In the case where image information in which the time of the date and time information is "13:06:07" exists next to image information in which the time of the associated date and time information is "13:06:05", for example, the controller 101 displays the image of the image information with which "13:06:07" is associated, on the touch panel 103 after two seconds from the display of the image (image of the musical score) of the image information with which "13:06:05" is associated, on the touch panel 103. In the embodiment, when a performance is recorded, image information is recorded every two seconds, and therefore the image of the musical score on the touch panel 103 is updated every two seconds.

In the embodiment, when a performance file is reproduced, as described above, an automatic performance is performed in the electronic music instrument 10, and an image of the musical score used in the performance is displayed. Therefore, the user can easily know the performed music piece, and what portion of the music piece has been performed. In the embodiment, the musical score, i.e., information indicating the performed music piece is recorded simply by instructing the start and end of recording of the performance. Therefore, information indicating the performed music piece can be easily recorded without causing the user to conduct a cumbersome operation such as inputting of a character string.

Next, operations which are to be conducted when a performance file is stored in the server apparatus 20 will be described. When the produced performance file is to be stored in the server apparatus 20, the user conducts an operation of instructing display of a list of performance files, through the touch panel 103. When the operation is conducted, the controller 101 refers the performance files stored in the storage section 102, and controls the touch panel 103 so as to display a list of the performance files.

When the user selects a performance file from the list shown in FIG. 8, and an operation of instructing transmission of the selected performance file to the server apparatus 20 is conducted through the touch panel 103, for example, the controller 101 reads the performance file which is selected by the user, and the music instrument identifier from the storage section 102, and controls the communicating section 105 so as to transmit the performance file and music instrument identifier which are read out, to the server apparatus 20. When the communicating section 205 of the server apparatus 20 receives the performance file and music instrument identifier which are transmitted from the electronic music instrument 10, the controller 201 associates and stores the received performance file and music instrument identifier which are received by the communicating section 205, in the storage section 202.

Next, operations which are to be conducted when a performance file is acquired from the server apparatus 20 will be described. Firstly, the user conducts an operation of requesting the list of performance files which are stored in the server apparatus 20, through the touch panel 103, the electronic music instrument 10 transmits a message which contains a music instrument identifier, and which requests for the list of performance files, to the server apparatus 20.

When the message is received by the server apparatus 20, the controller 201 produces a list of performance files with which the music instrument identifier contained in the received message is associated, and transmits the produced list to the electronic music instrument 10. When the list transmitted from the server apparatus 20 is received by the communicating section 105 of the electronic music instrument 10, the controller 101 displays, in accordance with the received list, the performance file identifier, the date and time of starting performance, the date and time of ending performance, and the image of the musical score, on the touch panel 103 as shown in, for example, FIG. 8.

When the user selects a performance file from the displayed list, and an operation of instructing acquisition of the selected performance file is conducted through the touch panel 103, the controller 101 transmits a message which contains the performance file identifier of the performance file that is selected by the user, and which requests for the performance file, to the server apparatus 20.

When the message is received by the server apparatus 20, the controller 201 searches for a performance file with which the performance file identifier contained in the received message is associated, in the storage section 202. When the server apparatus 20 finds a performance file containing the performance file identifier, the server apparatus transmits the found performance file to the electronic music instrument 10. When the performance file transmitted from the server apparatus 20 is received by the electronic music instrument 10, the controller 101 stores the received performance file in the storage section 102. When an operation of instructing display of the list of performance files which are stored in the storage section 102 is then conducted through the touch panel 103, information of the performance file acquired from the server apparatus 20 is displayed in the list of performance files. When the user selects the performance file acquired from the server apparatus 20 in the displayed list, and an operation of instructing reproduction of the selected performance file is conducted through the touch panel 103, the performance file acquired from the server apparatus 20 is reproduced.

In the embodiment, when an operation of instructing ending of recording of the performance is conducted, the produced performance file may be automatically transmitted to the server apparatus 20 to be stored in the server apparatus 20. In the embodiment, moreover, the MIDI message, musical score information, and date and time information which are produced by the electronic music instrument 10 may be transmitted to the server apparatus through the network, and the server apparatus may produce and store a performance file.

[Modifications]

Although the embodiment of the invention has been described, the invention is not limited to the above-described embodiment, and may be implemented in various other manners. For example, the invention may be implemented by modifying the above-described embodiment in the following manners. The above-described embodiment and the following modifications may be combined with each other.

Although, in the above-described embodiment, the electronic music instrument 10 is an automatic performance piano including the mechanism of an acoustic piano, the electronic music instrument 10 is not limited to such an automatic performance piano. For example, the electronic music instrument may be an electronic piano or electronic keyboard not including the mechanism of an acoustic piano. Moreover, the electronic music instrument 10 is not limited to a keyboard instrument, and may be another kind of electronic music instrument as far as it can output a MIDI message in accordance with the performance by the performer.

Although, in the above-described embodiment, a MIDI message is stored as the performance information, the performance information is not limited to a MIDI message. For example, sounds of the performance may be picked up by a microphone, and the picked-up sounds may be digitized and stored.

In the above-described embodiment, in the case where a performance file is to be acquired from the server apparatus 20, the electronic music instrument 10 acquires a performance file with which the own music instrument identifier is associated. The invention is not limited to this configuration. When a list of performance files is to be transmitted to the electronic music instrument 10, the server apparatus 20 may cause also performance files which are produced by music instruments other than the electronic music instrument 10 that issues the request for the list, to be contained in the list of performance files.

Although, in the above-described embodiment, the electronic music instrument 10 transmits a performance file to the server apparatus 20, the invention is not limited to this configuration. For example, a configuration may be employed where the MIDI message, date and time information, and image information which are produced by the electronic music instrument 10 are output to a computer apparatus (for example, a personal computer, a smart phone, a tablet terminal, or the like) connected to the interface 150. In the configuration, operations of starting and ending recording of a performance may be conducted in the computer apparatus, and a performance file may be stored in the computer apparatus.

In the configuration where the computer apparatus is connected to the interface 150, a configuration may be employed where a camera module disposed in the computer apparatus takes an image of a musical score, and image information of the musical score is produced by the computer apparatus. In the configuration where the computer apparatus is connected to the interface 150, furthermore, sounds of the performance may be picked up by a microphone disposed in the computer apparatus, and the picked-up sounds may be digitized and stored.

In the configuration where the computer apparatus is connected to the interface 150, for example, the computer apparatus may be a tablet terminal, and an electronized image of a musical score may be displayed on the tablet terminal. In the modification, the image information of the musical score displayed on the tablet terminal may be sent to the electronic music instrument 10, and the image information sent to the electronic music instrument 10 may be contained in a performance file in the electronic music instrument 10. In the modification, furthermore, a MIDI message and the date and time information may be sent from the electronic music instrument 10 to the tablet terminal, and the tablet terminal may produce a performance file while bundling together the sent MIDI message and date and time information, and the image information of the musical score displayed on the tablet terminal.

In a configuration which uses a computer apparatus, the computer apparatus may not be connected to the interface 150 via a cable, and the electronic music instrument 10 and the computer apparatus may exchange information through wireless communication.

In the above-described modification, in the case where image information of a musical score is stored in the server apparatus 20, and an image of the musical score is displayed on a computer apparatus which cooperates with the electronic music instrument 10, the image information of the musical score which is stored in the server apparatus 20 may be acquired, and an image of the musical score may be displayed. In the modification, in place of image information, a URL (Uniform Resource Locator) indicating the storage location of the image information of the musical score may be contained in the performance file. When the performance file containing the URL is to be reproduced, the image information is acquired based on the contained URL, and the image of the musical score is displayed based on the acquired image information.

Although, in the above-described embodiment, an image of the musical score is taken by the imaging section 106 disposed in the electronic music instrument 10, the invention is not limited to this configuration. For example, a video camera having a normal lens or a wide-angle lens may be connected to the interface 150, and image information of the musical score may be produced from an image obtained by the video camera.

In the above-described embodiment, the mage indicated by the stored image information indicates the musical score. Alternatively, the mage indicated by the image information may contain information of the date and time in the date and time information which is stored while being associated with the image information.

Although, in the above-described embodiment, a portion of the musical score is identified from the image obtained by the imaging section 106, and an image of the musical score is recorded, the invention is not limited to this configuration. For example, information to be recorded is not limited to a portion of a musical score, and image information of an image which is acquired by planarizing an image obtained by the camera module may be contained in a performance file. According to the configuration, also an image of the performer can be recorded.

Although, in the above-described embodiment, the date and time information is stored while being associated with the image information, the invention is not limited to this configuration. For example, image information which is produced with a predetermined period may be contained in a performance file while not being associated with the date and time information.

Although, in the above-described embodiment, image information is produced with a predetermined period, and the produced image information is bundled into a performance file, the invention is not limited to this configuration.

For example, image information may be produced at a timing which is instructed by the user, and the produced image information may be contained in a performance file. Alternatively, image information may not be produced during a performance, image information may be produced at the start of recording of the performance or the end of recording of the performance, and the produced image information may be contained in a performance file.

Although, in the above-described embodiment, image information of the musical score is produced and stored with a predetermined period, the invention is not limited to this configuration. For example, image information which is arranged in time sequence may be compared with each other. When the contents of images are not changed, image information which is lately produced may be erased. In a configuration where images of the musical score are compared with each other, the time period which elapses until the image of the musical score is changed may be recorded, and the recorded time period may be displayed superimposedly on the image of the musical score.

Although, in the above-described embodiment, the image of the musical score is produced from the image obtained by the imaging section 106, the method of obtaining the image of the musical score is not limited to this configuration. For example, the image of the musical score obtained by the imaging section 106, and an image of the musical score which is read by a scanner, and which is previously stored may be subjected to pattern matching, and, in the image which is previously stored, image information of the musical score which is determined to be identical or similar to the image of the musical score obtained by the imaging section 106 may be contained in a performance file. In the modification, image information of a page of the musical score which is determined to be identical or similar to the image of the musical score obtained by the imaging section 106 may be contained in a performance file.

Alternatively, the title of the music piece of the musical score which, by the pattern matching, is determined to be identical or similar to the image of the musical score obtained by the imaging section 106 may be identified, and information indicating the identified music piece title may be contained in a performance file. When the performance file is reproduced, the music piece title contained in the performance file may be displayed on the touch panel 103.

In the invention, in the case where the musical score is not placed on the music stand 170, and a portion of the musical score cannot be identified from the image obtained by the imaging section 106, image information may not be produced. In the modification, the date and time when the musical score is placed on the music stand 170, and a portion of the musical score can be identified may be recorded as that when the musical score is opened, and that when the musical score is closed on the music stand 170, and a portion of the musical score cannot be identified may be recorded as that when the musical score is closed.

In the invention, a bar code indicating a musical score may be written in the musical score, the bar code written in the musical score may be analyzed in the image obtained by the imaging section 106, and the imaged musical score may be identified. In the modification, in each page of the musical score, a bar code containing information of the page may be written, so that the page of the musical score can be identified. In the modification, images of scanned musical scores may be stored in a database, and an image of a musical score which is identified by analyzing a bar code may be acquired from the database and contained in a performance file.

In the above-described embodiment, an image of image information may be analyzed, a MIDI message corresponding to a musical score may be produced, the produced MIDI message and a MIDI message which is produced by a performance may be compared with each other, and the number of performances of a portion of the musical score may be analyzed. The performance number which is obtained by analysis may be displayed on the touch panel 103.

In the above-described embodiment, the time period which elapses until the image of the musical score is changed may be measured, and the time period when the imaging process is conducted may be displayed for each of images of a plurality of musical scores. According to the configuration, with respect to each page of the musical score, the time period when the performer viewed the page can be known, and also that when the performer performed a performance with respect to the page can be known.

In the above-described embodiment, in the case where a performance file is selected from the list of performance files, thumbnails of musical scores indicated by image information contained in the performance file may be displayed.

Although, in the above-described embodiment, the date and time information contained in a performance file indicates the date and the time, the invention is not limited to this configuration. For example, information which contains the date and time of starting recording of a performance, and which is associated with a MIDI message and image information may be the time period which has elapsed from the date and time of starting recording of the performance.

In the above-described embodiment, the number of the camera module is not limited to one, and a plurality of camera modules may be disposed. In the case where a plurality of camera modules each having a fisheye lens are disposed, an image of a musical score may be produced from the signal from a camera module which produces an excellent image of the musical score.

The application is based on Japanese Patent Application (No. 2013-107000) filed May 21, 2013, and its disclosure is incorporated herein by reference.

INDUSTRIAL APPLICABILITY

According to the invention, information indicating a performance performed by a performer, and that indicating a performed music piece can be easily recorded.

REFERENCE SIGNS LIST

1 . . . recording system, 10 . . . electronic music instrument, 20 . . . server apparatus, 101 . . . controller, 102 . . . storage section, 103 . . . touch panel, 105 . . . communicating section, 106 . . . imaging section, 107 . . . sensor section, 108 . . . driving section, 150 . . . interface, 170 . . . music stand, 201 . . . controller, 202 . . . storage section, 203 . . . displaying section, 204 . . . operating section, 205 . . . communicating section, 1001 . . . performance information producing section, 1002 . . . image information producing section, 1003 . . . time measuring section, 1004 . . . transmitting section, 1005 . . . receiving section, 1006 . . . performing section, 1007 . . . display controller

The invention claimed is:

1. A performance recording apparatus comprising:
    a plurality of operators manipulable by a performer to play music;
    a storage device;
    a sensor associated with each of the operators;
    an imaging device configured to capture an image; and
    a controller configured to execute:
        a performance information acquiring task that acquires and stores in the storage device performance information indicative of a performer manipulating the operators based on signals obtained from the sensors;
        a musical score information acquiring task that acquires and stores in the storage device musical score information corresponding to a musical score used by the performer during the performance information acquiring task, from an image of the musical score captured by the imaging device; and
        a file generating task that generates a performance recording file containing both the performance information and the musical score information in association with each other.

2. The performance recording apparatus according to claim 1, wherein the musical score information acquiring task acquires the musical score information based on image information acquired from the image captured by the imaging device.

3. The performance recording apparatus according to claim 2, wherein the performance recording file includes date and time information indicating a date and time when the musical score information is acquired.

4. The performance recording apparatus according to claim 2, wherein:
    the image information is produced for a predetermined period, and
    the image information is associated with the date and time information indicating the date and time when the image information is acquired.

5. The performance recording apparatus according to claim 2, wherein the musical score information acquiring task acquires the musical score information by matching a pattern of the image captured by the imaging device with the musical score information stored in the storage device.

6. The performance recording apparatus according to claim 2, wherein:
    the musical score includes a code identifying the musical score, and
    the musical score information acquiring task analyzes the code based on the image information acquired from the image captured by the imaging device to acquire the musical score information.

7. The performance recording apparatus according to claim 2, wherein the musical score information acquiring task identifies a portion corresponding to the musical score from the image information acquired from the image captured by the imaging device to acquire the musical score information.

8. The performance recording apparatus according to claim 1, further comprising:
    a communicating device including a communication interface connectable to a computer apparatus,
    wherein the musical score information acquiring task acquires the musical score information based on the image information acquired from the captured image, which is a musical score displayed on the computer apparatus, through the communicating device.

9. The performance recording apparatus according to claim 8, wherein the musical score information acquiring task also acquires the image information of the musical score displayed on the computer apparatus from a remotely located storage device.

10. A performance recording method using a performance recording apparatus comprising:
a plurality of operators manipulable by a performer to play music;
a storage device;
a sensor associated with each of the operators;
an imaging device configured to capture an image; and
a controller,
wherein the method is executable by the controller and comprises:
a performance information acquiring step of acquiring and storing in the storage device performance information indicative of a performer manipulating the operators based on signals obtained from the sensors;
a musical score information acquiring step of acquiring and storing in the storage device musical score information corresponding to a musical score used by the performer during the performance information acquiring step, from an image of the musical score captured by the imaging device; and
a file generating step of generating a performance recording file containing both the performance information and the musical score information in association with each other.

11. The performance recording method according to claim 10, wherein the musical score information acquiring step acquires the musical score information based on image information acquired from the image captured by the imaging device.

12. The performance recording method according to claim 11, wherein the performance recording file includes date and time information indicating a date and time when the musical score information is acquired.

13. The performance recording method according to claim 11, wherein:
the image information is produced for a predetermined period, and
the image information is associated with the date and time information indicating the date and time when the image information is acquired.

14. The performance recording method according to claim 11, wherein the musical score information acquiring step acquires the musical score information by matching a pattern of the image captured by the imaging device with the musical score information stored in the storage device.

15. The performance recording method according to claim 11, wherein:
the musical score includes a code identifying the musical score, and
the musical score information acquiring step analyzes the code based on the image information acquired from the image captured by the imaging device to acquire the musical score information.

16. The performance recording method according to claim 11, wherein the musical score information acquiring step identifies a portion corresponding to the musical score from the image information acquired from the image captured by the imaging device to acquire the musical score information.

17. The performance recording method according to claim 10, wherein:
the performance recording apparatus further includes a communicating device including a communication interface connectable to a computer apparatus, and
the musical score information acquiring step acquires the musical score information based on the image information acquired from the captured image, which is a musical score displayed on the computer apparatus, through the communicating device.

18. The performance recording method according to claim 17, wherein the musical score information acquiring step also acquires the image information of the musical score displayed on the computer apparatus from a remotely located storage device.

* * * * *